United States Patent
Houghton et al.

(10) Patent No.: US 11,308,689 B2
(45) Date of Patent: *Apr. 19, 2022

(54) THREE DIMENSIONAL SCANNING AND DATA EXTRACTION SYSTEMS AND PROCESSES FOR SUPPLY CHAIN PIECE AUTOMATION

(71) Applicant: IAM ROBOTICS, LLC, Sewickley, PA (US)

(72) Inventors: Ricky Alan Houghton, Wexford, PA (US); Thomas Galluzzo, Gibsonia, PA (US); Vladimir Altman, Pittsburgh, PA (US)

(73) Assignee: IAM Robotics, LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/385,168

(22) Filed: Apr. 16, 2019

(65) Prior Publication Data
US 2019/0244421 A1    Aug. 8, 2019

Related U.S. Application Data (63) Continuation of application No. 15/205,519, filed on Jul. 8, 2016, now Pat. No. 10,311,634.

(60) Provisional application No. 62/194,873, filed on Jul. 21, 2015.

(51) Int. Cl.
*G06T 17/10* (2006.01)
*G06Q 10/08* (2012.01)
*H04N 13/243* (2018.01)
*G06T 7/66* (2017.01)
*G06T 17/00* (2006.01)

(52) U.S. Cl.
CPC .......... *G06T 17/10* (2013.01); *G06Q 10/087* (2013.01); *G06T 7/66* (2017.01); *G06T 17/00* (2013.01); *H04N 13/243* (2018.05); *G06T 2200/04* (2013.01); *G06T 2200/08* (2013.01)

(58) Field of Classification Search
CPC .......... G06T 17/10; G06T 17/00; G06T 7/66; G06T 2200/04; G06T 2200/08; H04N 13/243; G06Q 10/087
See application file for complete search history.

(56) References Cited

U.S. PATENT DOCUMENTS

| | | | |
|---|---|---|---|
| 5,042,015 A | 8/1991 | Stringer | |
| 5,105,392 A | 4/1992 | Stringer et al. | |
| 5,220,536 A | 6/1993 | Stringer et al. | |
| 5,546,475 A | 8/1996 | Bolle | |
| 5,651,237 A * | 7/1997 | De Luca | B65B 31/06 53/172 |
| 6,155,489 A | 12/2000 | Collins | |
| 6,471,125 B1 | 10/2002 | Addy | |

(Continued)

*Primary Examiner* — Aaron W Carter
(74) *Attorney, Agent, or Firm* — Dentons Cohen & Grigsby P.C.

(57) ABSTRACT

Managing supply chain inventory is accomplished by measuring the dimensions and the weight of a product. A plurality of images of the product is obtained. The shape of the outer surface of the product is determined. The center of gravity of the product can be calculated. A product model that includes a three dimensional representation of the shape of a configuration of the product and optionally the center of gravity of the product is generated. The product model is stored in memory for future use.

19 Claims, 7 Drawing Sheets

(56) References Cited

U.S. PATENT DOCUMENTS

| | | |
|---|---|---|
| 6,606,579 B1 | 8/2003 | Gu |
| 7,136,539 B2 | 11/2006 | Weyl |
| 8,281,640 B2 * | 10/2012 | Haussmann ............ G01G 21/26 73/1.13 |
| 8,639,644 B1 * | 1/2014 | Hickman ................ G06N 3/008 700/245 |
| 8,794,447 B2 * | 8/2014 | Van Kasteren ....... B07C 5/3422 209/552 |
| 9,120,622 B1 * | 9/2015 | Elazary ................. B25J 19/023 |
| 9,227,323 B1 * | 1/2016 | Konolige ............... B25J 9/1612 |
| 9,248,611 B2 * | 2/2016 | Divine ................. B29C 64/176 |
| 9,412,050 B2 | 8/2016 | He |
| 9,457,970 B1 * | 10/2016 | Zevenbergen ......... B65G 67/02 |
| 9,486,927 B1 * | 11/2016 | Morey ..................... B25J 15/10 |
| 9,550,561 B1 * | 1/2017 | Beckman ............... B64C 17/00 |
| 9,562,762 B2 * | 2/2017 | McGuire ............... G03B 17/561 |
| 9,563,197 B2 * | 2/2017 | Stiernagle ............ G05B 19/102 |
| 9,688,489 B1 * | 6/2017 | Zevenbergen ......... B65G 67/20 |
| 9,718,188 B2 * | 8/2017 | Stubbs ................. G05B 19/418 |
| 9,926,138 B1 * | 3/2018 | Brazeau ................. B25J 5/007 |
| 9,978,036 B1 * | 5/2018 | Eller ................... G06Q 10/087 |
| 10,130,232 B2 * | 11/2018 | Atchley .................. G01S 1/72 |
| 10,169,660 B1 * | 1/2019 | Ren ...................... H04L 67/10 |
| 10,311,634 B2 * | 6/2019 | Houghton ............ G06Q 10/087 |
| 10,318,917 B1 * | 6/2019 | Goldstein ............ G06Q 20/208 |
| 10,354,316 B2 * | 7/2019 | Blass ................. G06Q 30/0639 |
| 10,360,531 B1 * | 7/2019 | Stallman ............... G06K 7/1413 |
| 10,810,540 B1 * | 10/2020 | Gopal ................. G01G 19/387 |
| 2002/0116281 A1 * | 8/2002 | Costello ............ G06Q 30/0625 705/26.3 |
| 2003/0021454 A1 | 1/2003 | Weyl |
| 2003/0158796 A1 | 8/2003 | Balent |
| 2006/0162518 A1 | 7/2006 | Biggs |
| 2007/0177160 A1 | 8/2007 | Sasaki |
| 2007/0186626 A1 * | 8/2007 | Latiri ................... A63B 60/42 73/65.01 |
| 2008/0077511 A1 * | 3/2008 | Zimmerman ......... G06Q 10/00 705/28 |
| 2010/0206951 A1 | 8/2010 | Herwig |
| 2011/0004574 A1 | 1/2011 | Jeong |
| 2011/0036154 A1 * | 2/2011 | Kim ...................... B66C 13/48 73/65.01 |
| 2011/0129117 A1 | 6/2011 | Ross |
| 2011/0232445 A1 * | 9/2011 | Weber ................. G01G 15/02 83/77 |
| 2012/0283868 A1 | 11/2012 | Rutt |
| 2012/0303154 A1 * | 11/2012 | Stiernagle ............ G06Q 20/18 700/214 |
| 2013/0048722 A1 | 2/2013 | Davis |
| 2013/0182079 A1 | 7/2013 | Holz |
| 2013/0317642 A1 * | 11/2013 | Asaria ................... G06Q 10/08 700/216 |
| 2013/0343640 A1 * | 12/2013 | Buehler .................. B25J 9/163 382/155 |
| 2014/0111615 A1 | 4/2014 | McGuire |
| 2014/0176535 A1 | 6/2014 | Krig |
| 2014/0252091 A1 | 9/2014 | Morse |
| 2014/0260569 A1 * | 9/2014 | Watanabe ............. G01M 1/122 73/65.07 |
| 2014/0300779 A1 | 10/2014 | Yeo |
| 2014/0316573 A1 * | 10/2014 | Iwatake ................ B25J 9/1697 700/258 |
| 2014/0372116 A1 * | 12/2014 | Smith ................... B25J 13/003 704/235 |
| 2015/0006308 A1 * | 1/2015 | Lin .................... G06Q 30/0605 705/26.2 |
| 2015/0032252 A1 | 1/2015 | Galluzzo et al. |
| 2015/0039458 A1 | 2/2015 | Reid |
| 2015/0057793 A1 | 2/2015 | Kawano |
| 2015/0096266 A1 | 4/2015 | Divine |
| 2015/0193761 A1 | 7/2015 | Svetal |
| 2015/0332213 A1 | 11/2015 | Galluzzo et al. |
| 2016/0090248 A1 * | 3/2016 | Worsley ................ B65G 61/00 414/398 |
| 2016/0140488 A1 * | 5/2016 | Lindbo ............... G06Q 10/087 705/28 |
| 2016/0150213 A1 | 5/2016 | Mutti |
| 2016/0155082 A1 * | 6/2016 | Kieffer ................ G06Q 10/083 705/330 |
| 2016/0182797 A1 | 6/2016 | Kervec |
| 2016/0189286 A1 | 6/2016 | Zohar |
| 2016/0236865 A1 * | 8/2016 | Altemir ................ B65G 1/0407 |
| 2016/0292775 A1 * | 10/2016 | Blass ................. G06Q 30/0633 |
| 2016/0325934 A1 * | 11/2016 | Stiernagle ............. B25J 9/1679 |
| 2016/0368222 A1 * | 12/2016 | Kobayashi ............ B23Q 15/22 |
| 2017/0024896 A1 | 1/2017 | Houghton |
| 2017/0080566 A1 * | 3/2017 | Stubbs ................. B25J 9/1679 |
| 2017/0147971 A1 | 5/2017 | Morse |
| 2017/0185933 A1 * | 6/2017 | Adulyasak ....... G06Q 10/06315 |
| 2018/0284760 A1 * | 10/2018 | Gupta .................. B25J 13/006 |
| 2019/0062055 A1 * | 2/2019 | Hance ................. G06Q 10/083 |
| 2019/0087772 A1 * | 3/2019 | Medina ................. G05D 1/101 |
| 2019/0244421 A1 * | 8/2019 | Houghton ............. G06T 17/10 |
| 2020/0017297 A1 * | 1/2020 | Mohan .................. G06Q 50/28 |
| 2020/0065748 A1 * | 2/2020 | Durkee ................ G06K 7/1408 |
| 2020/0097892 A1 * | 3/2020 | Cheng ................. G06K 7/1413 |

* cited by examiner

THREE DIMENSIONAL SCANNING AND DATA EXTRACTION SYSTEMS AND PROCESSES FOR SUPPLY CHAIN PIECE AUTOMATION

CROSS REFERENCE TO RELATED APPLICATION

This patent application claims priority from U.S. Provisional Application Ser. No. 62/194,873 filed Jul. 21, 2015, the entire contents of which are incorporated by reference herein.

FIELD OF THE INVENTION

The invention relates to systems and methods for creating three dimensional representations of products to automate a supply chain. More particularly, the invention is directed to the creation of scanned three-dimensional (3D) models, the extraction and measurement of classification features, and the collection of images and meta-data of products for the purpose of supply chain automation and other inventory management tasks.

BACKGROUND OF THE INVENTION

Supply chain management is the management of the flow of goods and services. It includes the movement and storage of inventories of products. Such products can be stored for retrieval by pick workers, autonomous robots, or customers in logistics facilities, such as distribution centers or retail stores. Each type of item is known as a stock keeping unit (SKU), and each SKU has one or more locations where it is kept. These items can be stored openly on shelving racks, or in compartmentalized containers, such as boxes or bins.

Items are often stored in sealed cases in a wholesale center. In such centers, individual units are packed together in a shipping case, as when they are received from a manufacturer. Cases can further be grouped together and stored on pallets, which is common for freight shipments of goods.

The process of breaking the cases or pallets for individual product picking, that is, taking the individual pieces from the case or pallet and placing them in a specific storage location in a facility, is called put-away or replenishment. The process of picking or selecting individual items from a specific storage location in a facility is known as piece-picking or each-picking. Put-away and piece-picking happens in both distribution warehouses and retail centers, whereas case-picking or pallet-picking typically only happens at a wholesale distribution center.

A fundamental problem with piece-picking and other related operations is that the manipulation and automation of products within in the supply chain requires detailed information about the product to support high quality product identification. This information can include such things as the weight, width, height, depth and images of the package. Such information can be critical information for shipping, storage and manipulation of the boxes, cartons and pallets of goods. Shippers also need this data in order to charge customers correctly to ship the package, to understand how to pack their trucks or to store the packages.

Scanners have been used within the field of supply chain management. However, scanners have had a limited role in scanning moving boxes, containers, crates and cases of product, not product pieces. Moreover, these scanners have not been 3D scanners because the applications of such scanners have been limited to applications involving hobbyists, gaming, and other commercial applications.

Hobbyists can use 3D scanners to produce 3D models for the purpose of 3D printing a duplicate or a modified version of real world items. Hobbyists can scan faces or human bodies and produce 3D models of the person to recreate a 3D printed model of said person. The output of these scanners are simple 3D models without higher-level knowledge of the scanned item.

Game and virtual reality (VR) designers use 3D scanners to produce models of objects, small and large, for inserting into their game or VR worlds. In this case a photorealistic version of the item or product is desired, however little more is needed to fit into their game or VR world.

Accordingly, there is a need for a high speed method and/or system that can obtain a full set of attributes required for autonomous product manipulation in a supply chain when working at the piece level.

SUMMARY OF THE INVENTION

The following summary is provided to introduce a selection of concepts in a simplified form that are further described below in the detailed description. This summary is not intended to identify key features or essential features of the claimed subject matter, nor is it intended to be used to limit the scope of the claimed subject matter.

Managing a supply chain is accomplished, in part, by measuring the dimensions and the weight of products in the supply chain. A plurality of images of the product is obtained. The shape of the outer surface of the product is determined. The center of gravity of the product is estimated. A product model that includes a three dimensional representation of the shape of the configuration of the product and the estimated center of gravity of the product is generated. This product model is stored in memory for later use in a multitude of ways.

These and other features and advantages will be apparent from a reading of the following detailed description and a review of the appended drawings. It is to be understood that the foregoing summary, the following detailed description and the appended drawings are explanatory only and are not restrictive of various aspects as claimed.

BRIEF DESCRIPTION OF THE DRAWINGS

For a fuller understanding of the nature and advantages of the present invention, reference should be made to the following detailed description, taken in connection with the accompanying drawings, in which.

DETAILED DESCRIPTION OF THE DRAWINGS

The detailed description provided below in connection with the appended drawings is intended to be a description of examples and is not intended to represent the only forms in which the present examples can be constructed or utilized. The description sets forth functions of the examples and sequences of steps for constructing and operating the examples. However, the same or equivalent functions and sequences can be accomplished by different examples.

References to "one embodiment," "an embodiment," "an example embodiment," "one implementation," "an implementation," "one example," "an example" and the like, indicate that the described embodiment, implementation or example can include a particular feature, structure or characteristic, but every embodiment, implementation or example may not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic can be implemented in connection with other embodiments, implementations or examples whether or not explicitly described.

Numerous specific details are set forth in order to provide a thorough understanding of one or more aspects of the described subject matter. It is to be appreciated, however, that such aspects can be practiced without these specific details. While certain components are shown in block diagram form to describe one or more aspects, it is to be understood that functionality performed by a single component can be performed by multiple components. Similarly, a single component can be configured to perform functionality described as being performed by multiple components.

An aspect of the invention is generally directed to systems and methods for creating digital models of products to manage a supply chain. As described further herein, an aspect of the invention is directed to using a scanning system to create digital 3D models of a product in various configurations. These models can be used for autonomous piece picking operations and for e-commerce, among other things.

The models can include high-resolution 3D representations of the outer surface of a product that provides valuable information, such as height, width, depth, center of gravity estimate and finer details like curvature and texture of the object. The system can achieve 3D scanning and features extraction that is optimized for speed to improve product throughput.

The system can obtain photos of each side (top, bottom, front, back, left and right side) of a product for the purpose of identification or verification of the product. These photos can include valuable visual clues for the purpose of identification. As a result, the model can include a collection of images that represent the front, back, left side, right side, top and bottom of the product.

The configurations can represent unique representations of each product in a database that are suitable for various tasks within the supply management chain process. The configurations can include a "packaging configuration", a "single product configuration" or "product configuration", and a "multiple product configuration" or "multiple configuration".

The "packaging configuration" represents data associated with the product within a box or other bulk packaging. The "product configuration" represents data associated with the product by itself (i.e., once the product is removed from its packaging). The "multiple configuration" represents a configuration for multiples of the same product that are grouped together in a single, bundled package. In some configurations, the product can include landmarks (i.e., UPC codes) and other visual clues that are present on the packaging. Examples of landmarks include barcodes, such as a Universal Product Code (UPC), an International Article Number (EAN), and a Global Trade Item Number (GTIN). The landmarks can be used as classification features.

The multiple configuration is particularly useful in autonomous piece picking operations that utilize autonomous robotic manipulation. In such operations, multiple products can be packaged by wrapping the products in clear plastic or some other form of banding. These items are stored in warehouses or in distribution centers as a single unit, even though they constitute a collection of items. In such cases, these operations become complicated due to the multiplicity of UPC codes and product "faces" that are positioned on package "sides" in a manner that can confuse automated image product detection software.

The system creates additional value by handling multiple configurations in a single source database. Users can request data relevant to picking a particular item from the system to perform an inventory management task. Users can also request product data that can include product images, as well as packaging data, for additional applications such as e-commerce.

Figure 1:
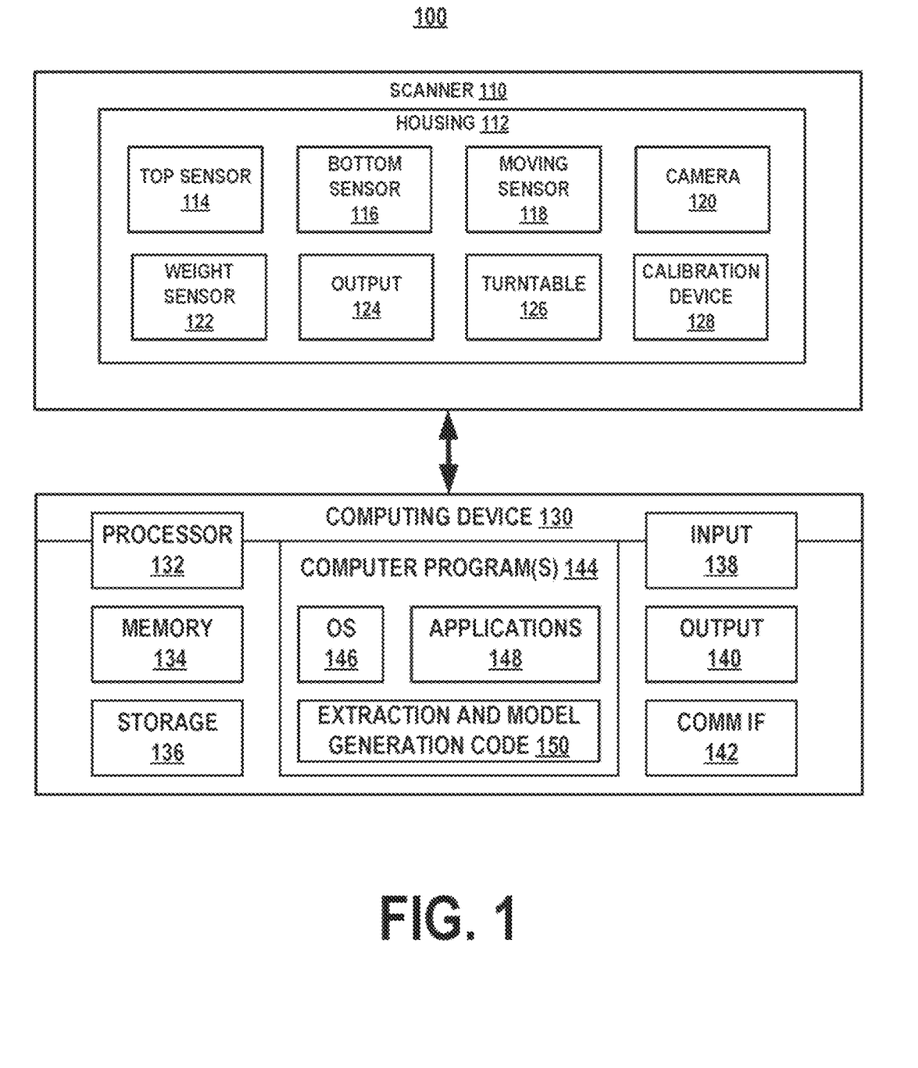
FIG. 1 is a block diagram of an exemplary system in accordance with an embodiment of the invention.

Referring to FIG. 1, a scanning system, generally designated as 100, can implement aspects of the described subject matter. The scanning system 100 can build digital models of products and extract additional information relating to the product. The information can include the product weight, high-resolution images of the outer surfaces of the product, landmarks, and other identification information. The information can also include location information and other data from the product, such as RFID tag—if available, so that automated inventory manipulation equipment can identify and handle the product effectively. The scanning system 100 can extract other metadata that can be useful for piece picking and/or other related inventory management operations.

The scanning system 100 can provide the information to an inventory management system, such as the systems shown in U.S. Patent Publication Nos. 2015/0332213 A1 and 2015/0032252 A1 to Galluzzo et al., which are incorporated herein by reference. Such systems can use the information to identify the product, to determine how to pick up the product, or to prepare for the weight of the product. Moreover, the inventory management system can change tools, based upon this information, or could recognize that it should move slower once it has grasped the product.

Figure 6A:
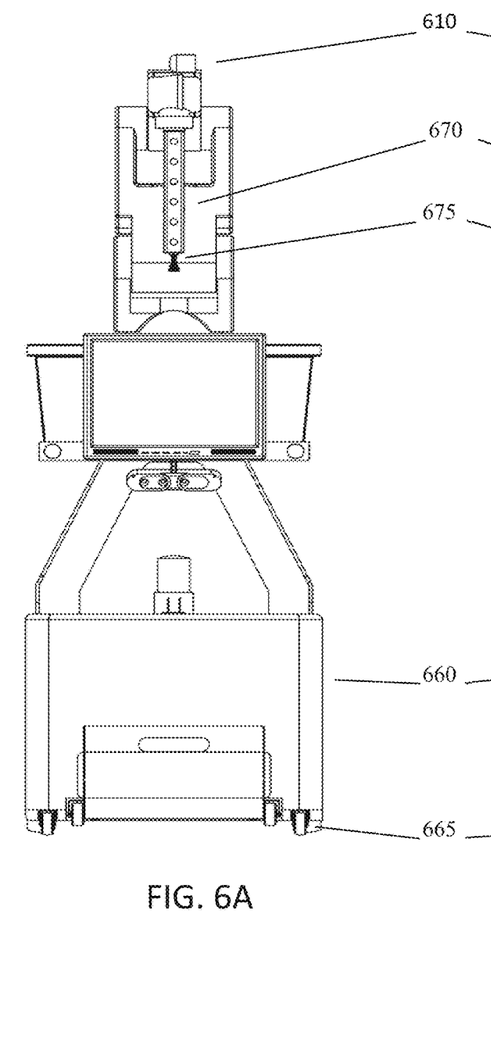
FIGS. 6A and 6B illustrate front and side views, respectively, in accordance with an embodiment of the invention.
Figure 6B:
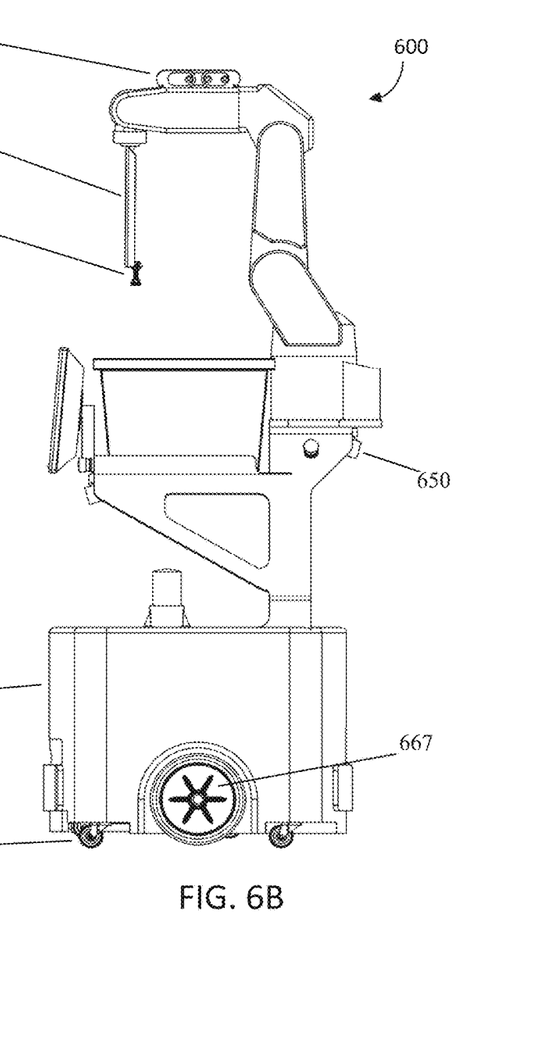

U.S. Patent Publication No. 2015/0332213 A1 discloses a system comprising a central server and one or more inventory robots 600, as shown in FIGS. 6A and 6B. The server includes a communication interface that sends and receives piece-picking data including a unique identification for each piece to be picked, a location within the supply chain facility of the pieces to be picked, and a route for the inventory robot to take within the supply chain facility. The unique identification for the piece to be picked may comprise a shape of the piece, a size of the piece, a weight of the piece, a color of the piece, a property of the construction material of the piece, such as roughness, porosity, and deformability, a visual marking on the piece, a barcode on the piece, or any combination thereof.

The inventory robot(s) may be able to autonomously navigate and position within the supply chain facility by recognition of at least one landmark by at least one sensor (610, 650) on the robot. Moreover, data from these robot sensors may be processed by an onboard computer processor of the robot in a navigation software module that provides local mapping information indicating areas around the robot that are traversable and those containing obstacles. Such sensors may include ground facing sensors (650) and sensors mounted on a manipulator arm of the inventory robot(s) (610).

The inventory robots have a mobile base 660 that is controlled by the onboard computer processor. The mobile base may have two main drive wheels 667 each driven by a servo motor. Each drive wheel may have an encoder that provides motion feedback, which can be used to precisely control the speed of each wheel in order to achieve the desired rotation and translation velocities of the robot. The feedback data may also be used for odometry to estimate the motion of the robot relative to the facility. The odometry may be responsible for guiding the robot navigation at times when visual markers are out of sensor range. The mobile base may also use passive wheels 665, such as casters, for stability and weight distribution.

The scanning system 100 can include a scanner 110. The scanner 110 can include a housing 112 for holding a plurality of sensors, including a top sensor 114, a bottom sensor 116, a moving sensor 118, a camera 120, and a weight sensor 122. The sensors 114-122 can be used to build high quality 3D models, to obtain images and/or to extract weight, height, depth, length, shape, landmark location(s), center of gravity, classification features, and other attributes that are needed for the various uses of the data. Each type of information, including the color of the product and/or the packaging, can be used by an automation system, inventory management device, and/or other manipulation device to determine how to reliably pick, pick up, manipulate, or otherwise move a product without damaging the product. In certain embodiments, the camera 120 may be a 3D camera such as the Orbbec Astra® Pro. Orbbec Astra® is a registered trademark of Orbbec 3D Tech. Int'l, Inc. based in Troy, Mich.

The top sensor 114, the bottom sensor 116, and the moving sensor 118 can include 3D depth sensors or other sensors for measuring the dimensions or other attributes of a product. The camera 120 can include color camera sensors. The weight sensor 122 can be a scale or other type of weight sensor. The sensors 114-122 can include software and/or hardware for converting sensor data into output 124. Optionally, the housing 112 can provide lighting, so that the scanning system 100 can determine the optimal lighting conditions to produce a suitable 3D representation of the product using the sensors 114-122.

The moving sensor 118 is mounted on a turntable 126 to facilitate motion. The top sensor 114, the bottom sensor 116, the camera 120, and the weight sensor 122 can be movable or static. The use of movable sensors is advantageous when it is necessary to obtain high speed, high quality scans. The scanning speed is critical for warehouses that have hundreds of thousands of unique products. Alternatively, the housing 112 can rotate the product for scanning.

In some cases, one or more of the sensors 114-122 will rotate around the product in order to achieve a full 3D model of the product. The remaining sensors 114-122 can remain stationary to extract other attributes of the product in order to gain a complete representation of the product from all angles. In other cases, the scanning system 100 can build a full 3D representation of the object without moving any of the sensors 114-122. The scanning system 100 can produce the same quality and type of output 124 in each case.

It should be understood that it is desirable to avoid spinning products in high speed, high quality scanning operations. Additionally, the motion in such operations can prevent the sensors 114-122 from being positioned at optimal angles.

A calibration device 128 can be placed within the housing 112. The calibration device 128 can be a block or other similar device with special markings for calibrating the top sensor 114, the bottom sensor 116, the moving sensor 118, and the camera 120.

The calibration device 128 has precise dimensions and precise surface patterns that are conducive to camera calibration. The surface patterns can include color calibration and/or other data that is useful for calibration and verification of system normal operation. Such data can include known bar codes and/or known RFID tags, for example, which might be part of calibration device.

The calibration device 128 can include information that can be encoded or incorporated therein to provide certain calibration details, such as the exact weight of the calibration device 128, for calibrating the weight sensor 122. This information can be encoded via a barcode, RFID tag, machine readable text or other similar mechanism.

The scanner 110 can use the encoded information to calibrate the sensors 114-122. Additionally, the scanner 110 can have the ability to detect, autonomously, the presence of calibration device 128 and the information contained thereon. Optionally, the scanner 110 can perform the calibration automatically, once the calibration device 128 is placed within the housing 112.

The scanning system 100 can include a computing device 130 to control the scanner 110 and to generate the models. It is to be appreciated that aspects of the computing device 130 can be implemented by various types of operating environments, computer networks, platforms, frameworks, computer architectures, and/or computing systems.

Implementations of the computing device 130 are described within the context of a device configured to perform various steps, methods, and/or functionality in accordance with aspects of the described subject matter. It is to be appreciated that a computing device or computer system can be implemented by one or more computing devices. Implementations of computing device 130 can be described in the context of "computer-executable instructions" that are executed to perform various steps, methods, and/or functionality in accordance with aspects of the described subject matter.

In general, a computer system or computing device can include one or more processors and storage devices (e.g., memory and disk drives) as well as various input devices, output devices, communication interfaces, and/or other types of devices. A computer system or computing device also can include a combination of hardware and software. It can be appreciated that various types of computer-readable storage media can be part of a computer system or computing device. As used herein, the terms "computer-readable storage media" and "computer-readable storage medium" do not mean and unequivocally exclude a propagated signal, a modulated data signal, a carrier wave, or any other type of transitory computer-readable medium. In various implementations, a computer system or computing device can include a processor configured to execute computer-executable instructions and a computer-readable storage medium (e.g., memory and/or additional hardware storage) storing computer-executable instructions configured to perform various steps, methods, and/or functionality in accordance with aspects of the described subject matter.

Computer-executable instructions can be embodied and/or implemented in various ways such as by a computer program (e.g., client program and/or server program), a software application (e.g., client application and/or server application), software code, application code, source code, executable files, executable components, routines, application programming interfaces (APIs), functions, methods, objects, properties, data structures, data types, and/or the like. Computer-executable instructions can be stored on one or more computer-readable storage media and can be executed by one or more processors, computing devices, and/or computer systems to perform particular tasks or implement particular data types in accordance with aspects of the described subject matter.

Computing device 130 can implement and utilize one or more program modules. Generally, program modules include routines, programs, objects, components, data structures, etc., that perform particular tasks or implement particular abstract data types.

Computing device 130 can be implemented as a distributed computing system or environment in which components are located on different computing devices that are connected to each other through network (e.g., wired and/or wireless) and/or other forms of direct and/or indirect connections. In such distributed computing systems or environments, tasks can be performed by one or more remote processing devices, or within a cloud of one or more devices, that are linked through one or more communications networks. In a distributed computing environment, program modules can be located in both local and remote computer storage media including media storage devices. Still further, the aforementioned instructions can be implemented, in part or in whole, as hardware logic circuits, which can include a processor.

Computing device 130 can be implemented by one or more computing devices such as computers, PCs, server computers configured to provide various types of services and/or data stores in accordance with aspects of the described subject matter. Exemplary sever computers can include, without limitation: web servers, front end servers, application servers, database servers, domain controllers, domain name servers, directory servers, and/or other suitable computers.

Components of computing device 130 can be implemented by software, hardware, firmware or a combination thereof. For example, computing device 130 can include components implemented by computer-executable instructions that are stored on one or more computer-readable storage media and that are executed to perform various steps, methods, and/or functionality in accordance with aspects of the described subject matter.

Computing device 130 can include a processor 132, memory 134, additional hardware storage 136, input devices 138, and output devices 140. Input devices 138 can include one or more of the exemplary input devices described above and/or other type of input mechanism and/or device. Output devices 140 can include one or more of the exemplary output devices described above and/or other type of output mechanism and/or device.

Computing device 130 can contain one or more communication interfaces 142 that allow computing device 130 to communicate with other computing devices and/or other computer systems. Communication interfaces 142 also can be used in the context of distributing computer-executable instructions.

Computing device 130 can include and/or run one or more computer programs 144 implemented, for example, by software, firmware, hardware, logic, and/or circuitry of computing device 130. Computer programs 144 can include an operating system 146 implemented, for example, by one or more exemplary operating systems described above and/or other type of operating system suitable for running on computing device 130. Computer programs 144 can include one or more applications 148.

Computer programs 144 can be configured via one or more suitable interfaces (e.g., API or other data connection) to communicate and/or cooperate with one or more resources. Examples of resources include local computing resources of computing device 130 and/or remote computing resources such as server-hosted resources, cloud-based resources, online resources, remote data stores, remote databases, remote repositories, web services, web sites, web pages, web content, and/or other types of remote resources.

Computer programs 144 can implement computer-executable instructions that are stored in computer-readable storage media such as memory 134 or hardware storage 136, for example. Computer-executable instructions implemented by computer programs 144 can be configured to work in conjunction with, support, and/or enhance one or more of operating system 146 and applications 148. Computer-executable instructions implemented by computer programs 144 also can be configured to provide one or more separate and/or stand-alone services.

Computing device 130 can implement and/or perform various aspects of the described subject matter. For example, computing device 130 can utilize extraction and model generation code 150 to obtain product data, such as product height, length, depth, and weight, and images from sensors 114-122. The model generation code 150 can use the product data and images to determine the shape of the outer surface of the product, to estimate the center of gravity of the product, and to generate a model of a configuration of the product. The model can include a three dimensional representation of the shape of the product and the estimated center of gravity of the product. The extraction and model generation code 150 can store the model in memory 134.

In some embodiments, the extraction and model generation code 150 can build models that include the product in one or more packaging configurations, product configurations, or multiple configurations. In other embodiments, the extraction and model generation code 150 can identify landmarks on the outer surface of the product and associate the landmark with the model in memory 134.

Figure 2:
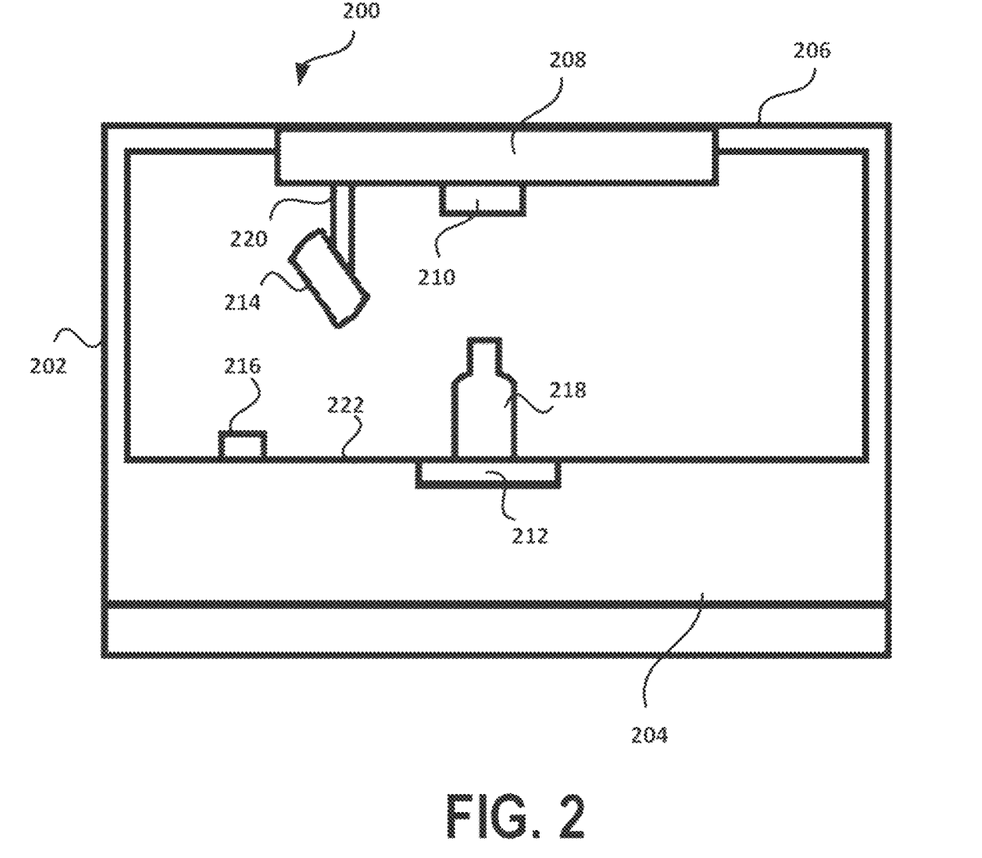
FIG. 2 is a side elevation view of a scanner in accordance with an embodiment of the invention.

Referring now to FIG. 2 with continuing reference to the forgoing figure, a scanner, generally designated by the numeral 200 is shown. The scanner 200 is suitable for use as a substitute for scanner 110 in scanning system 100, which is shown in FIG. 1. The scanner 200 includes a housing 202 having a base 204 and a cover 206. The cover 206 includes a turntable 208 mounted therein.

The scanner 200 includes a plurality of sensors, such as top sensor 210, bottom sensor 212, movable sensor 214, and weight sensor 216, for collecting data from a product 218. The top sensor 210 is mounted on the turntable 208. The bottom sensor 212 and the weight sensor 216 are mounted on the base 204. The movable sensor 214 is mounted on an arm 220 that extends from the turntable 208, so that the turntable 208 can move the movable sensor 214.

The base 204 includes a glass platform 222. The product 218 can be placed on the glass platform 222 to initiate the scanning process. Once the product 218 is placed on the glass platform 222, the computing device 130, shown in FIG. 1, utilizes the weight sensor 216 to detect the product 218 to determine that the product 218 is ready for scanning. Optionally, the computing device 130 can use additional information from the output 124 to determine whether the product 218 is ready for scanning.

The scanner 200 can be configured to initiate a product scan (i.e., an autoscan) without having a user push a button. However, it should be understood that the scanner 200 can be configured to require a user to push a button, a trigger, or a wireless device. It should also be understood that the scanner 200 can be configured to disable autoscan operations. Additionally, the scanner 200 can utilize visual signals or other similar devices to indicate that a scan is in progress.

Once a scan is initiated, the top sensor 210, the bottom sensor 212, the movable sensor 214, and the weight sensor 216 will begin extracting data from the product 218 on the glass platform 222. The movable sensor 214 can be configured to move around the product 218 automatically or as needed. The movable sensor 214 can move horizontally, vertically, in a circular pattern, at an angle, or in any other suitable manner to build a 3D model of the product 218.

The top sensor 210 and the bottom sensor 212 can be used to obtain data about the product, such as an image of the top or the bottom of the product 218. Such images can be used to build the 3D model of the product or to obtain product identification data for image matching via machine learning. The top sensor 210 and the bottom sensor 212 can obtain data that includes the precise location of a landmark for the purpose of product orientation during inventory management.

The computing device 130 can use the data from the top sensor 210, the bottom sensor 212, and the movable sensor 214 to find and to extract landmark data from the product 218. The landmark data can be used to identify the product 218 for supply chain management purposes. The computing device 130 can extract precise location of the center of the landmark and store it into database for later retrieval.

The computing device 130 can perform optical character recognition (OCR) on the images that are obtained from the top sensor 210, the bottom sensor 212, and/or the movable sensor 214 to extract additional information about the product 218. The information obtained through OCR can be used to identify the product or to determine product orientation during automated manipulation. Optionally, software applications, programs, or modules to perform OCR can be incorporated into the top sensor 210, the bottom sensor 212, and/or the movable sensor 214.

Figure 3:
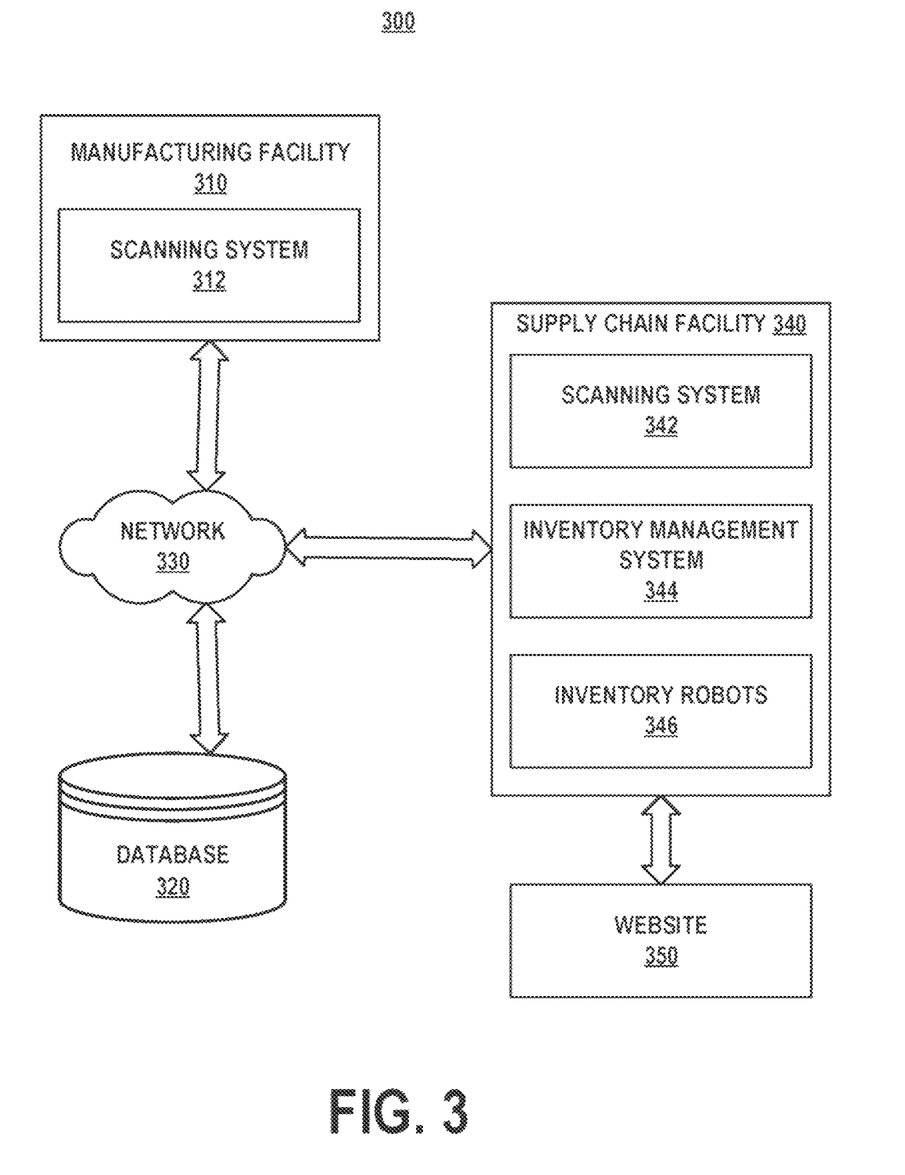
FIG. 3 is a block diagram of an exemplary operating environment in accordance with an embodiment of the invention.

Referring now to FIG. 3 with continuing reference to the foregoing figures, an exemplary operating environment, generally designated by the numeral 300, is shown. The operating environment 300 includes a manufacturing facility 310 having a scanning system 312, which can be the scanning system 100 shown in FIG. 1. The scanning system 312 can be connected to a database 320 over a network 330.

The network 330 can be implemented by any type of network or combination of networks including, without limitation: a wide area network (WAN) such as the Internet, a local area network (LAN), a Peer-to-Peer (P2P) network, a telephone network, a private network, a public network, a packet network, a circuit-switched network, a wired network, and/or a wireless network.

The scanning system 312 can communicate via the network 330 using various communication protocols (e.g., Internet communication protocols, WAN communication protocols, LAN communications protocols, P2P protocols, telephony protocols, and/or other network communication protocols), various authentication protocols, and/or various data types (web-based data types, audio data types, video data types, image data types, messaging data types, signaling data types, and/or other data types).

The scanning system 312 can generate a model to send to the database 320 over the network 330, so that the database 320 can function as a commercially available database repository for scanned product information. The database 320 can be a cloud-based database that can be accessed by third party data users. The third party data users can access the database 320 to purchase 3D models and additional data related to piece picking for e-commerce or for piece-automation. The models and data can be used in mass media, other media or even video games.

The cloud-based database can be hosted on a cloud environment provided by a cloud services provider (i.e., "the cloud"). In such cloud environments, data resources can be abstracted among or across one or more computers and/or computer networks that make up the cloud. Examples of cloud computing environments include S3 by Amazon.com.

The scanning system 312 can build a high resolution 3D model of the product that can include a collection of images that represent the front, back, left side, right side, top and bottom of the product. The scanning system 312 can identify, locate and read the UPC code for the product. After this step, the scanning system can use the 3D model to predict a center of gravity of the items by volumetric data and assuming a uniform distribution of the product weight in the container.

The scanning system 312 can provide indications, such as visual indications (blinking lights or solid color lights which means 'done'), auditory indications (beeping or audio playback), wireless indications (e.g., Bluetooth or other wireless communications), and/or electrical indications (triggering physical relay), to inform the operator (either human operator or robotic operator) that the scan is complete. Once the scan is complete, a computing device, such as computing device 130 shown in FIG. 1, will finish any computations in the background and upload the data into the database 320.

If the scanning system 312 cannot access the database 320 over the network, the scanning system 312 will store the data locally for later synchronization. Alternatively, a user can transfer data from the scanning system 312 to a memory card, memory stick, or other similar memory device. Additionally, the database 320 can hold raw data collected from the sensors, such as sensors 114-122 shown in FIG. 1.

The database 320 can be connected to a supply chain facility 340, such as a distribution facility or a retail store, over the network 330. The supply chain facility 340 can also optionally include a scanning system 342, which can be the scanning system 100 shown in FIG. 1. The supply chain facility 340 can include an inventory management system 344 and a plurality of inventory robots 346. The supply chain facility 340 can be optionally connected to the manufacturing facility 310 and to a website 350. The website 350 can display a representation of the product on a web page for ecommerce and/or to improve packaging of the product.

The operation of the inventory management system 344 and the inventory robots 346 can be improved using information contained within the product models, such as product identity or product orientation. For example, the inventory management system 344 and the inventory robots 346 can utilize the models to detect the top of a product, a product package, or other similar item to determine whether to pick up the item from the top, to turn the item, to change grasping hardware and/or to change technique. The inventory management system 344 and/or the inventory robots 346 can configure and utilize machine learning components to process information contained within the product models to enhance such operations.

The inventory management system 344 and the inventory robots 346 can optionally use landmark location information from the models to understand the orientation of the product. Other supply chain operations that can be enhanced through the use of product models include the identification of the product when parts of the box are obscured. Similarly, the inventory management system 344 and the inventory robots 346 can use product weight and estimated center of gravity to assist with the manipulation and picking of the product and/or the product packages.

Exemplary Processes

Figure 4:
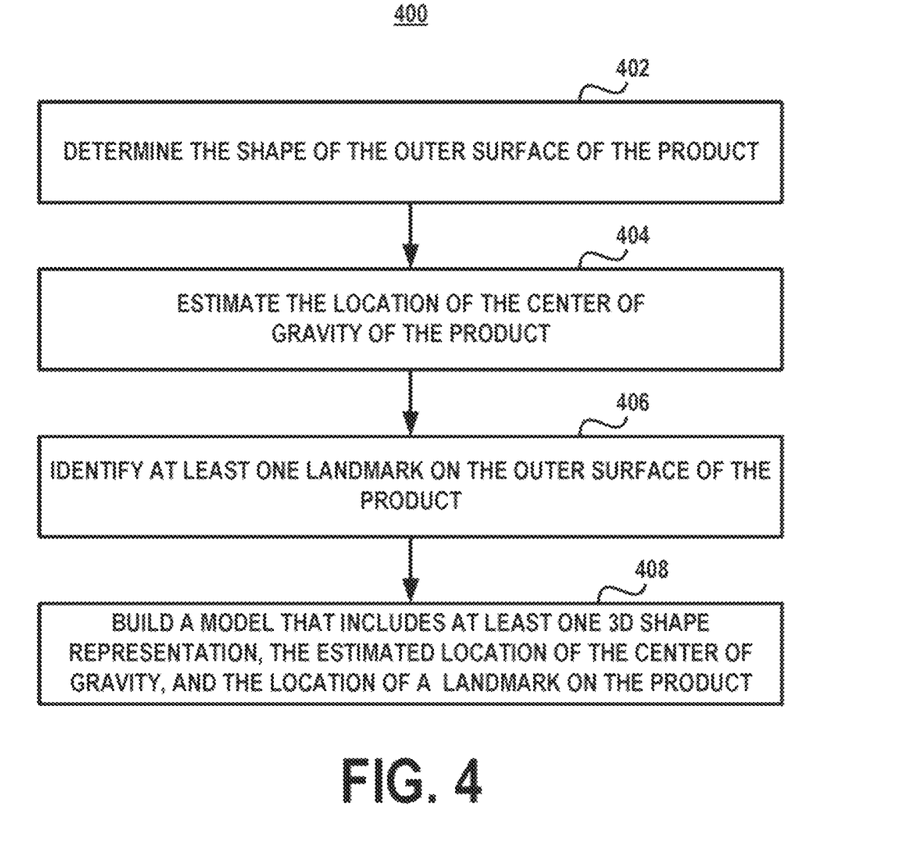
FIG. 4 illustrates an exemplary process in accordance with an embodiment of the invention.

Referring to FIG. 4 and with continuing reference to the foregoing figures, a computer-implemented method 400 is illustrated as an embodiment of an exemplary model generation process in accordance with aspects of the described subject matter. Computer-implemented method 400, or portions thereof, can be performed by one or more computing devices, a computer system, computer-executable instructions, software, hardware, firmware or a combination thereof in various embodiments. For example, computer-implemented method 400 can be performed by computing device 130 or other suitable computer system.

At 402, a computer system can determine the shape of the outer surface of a product. In this exemplary embodiment, the computing device 130, shown in FIG. 1, can use the output 124 from the scanner 110 to determine the shape of a product.

At 404, the computer system can estimate the center of gravity of the product. In this exemplary embodiment, the computing device 130 can use the output 124 from the scanner 110 to estimate the center of gravity of the product.

At 406, the computer system can identify at least one landmark on the outer surface of the product. In this exemplary embodiment, the computing device 130 can use the output 124 from the scanner 110 to identify at least one landmark on the outer surface of the product. Landmarks can include barcodes, UPC codes, EAN codes, and/or GTIN codes. Other landmarks can be text, symbols, images, pictures, or other distinctive indicia that can appear on the outer surface of the product and/or the product packaging.

At 408, the computer system can build a model that includes at least one three-dimensional representation of the shape of the product, the estimated center of gravity of the product, and the location of a landmark on the product. In this exemplary embodiment, the computing device 130 can use the output 124 from the scanner 110 to build the product model. The product model can include packaging configurations, product configurations, and/or multiple configurations.

Figure 5A:
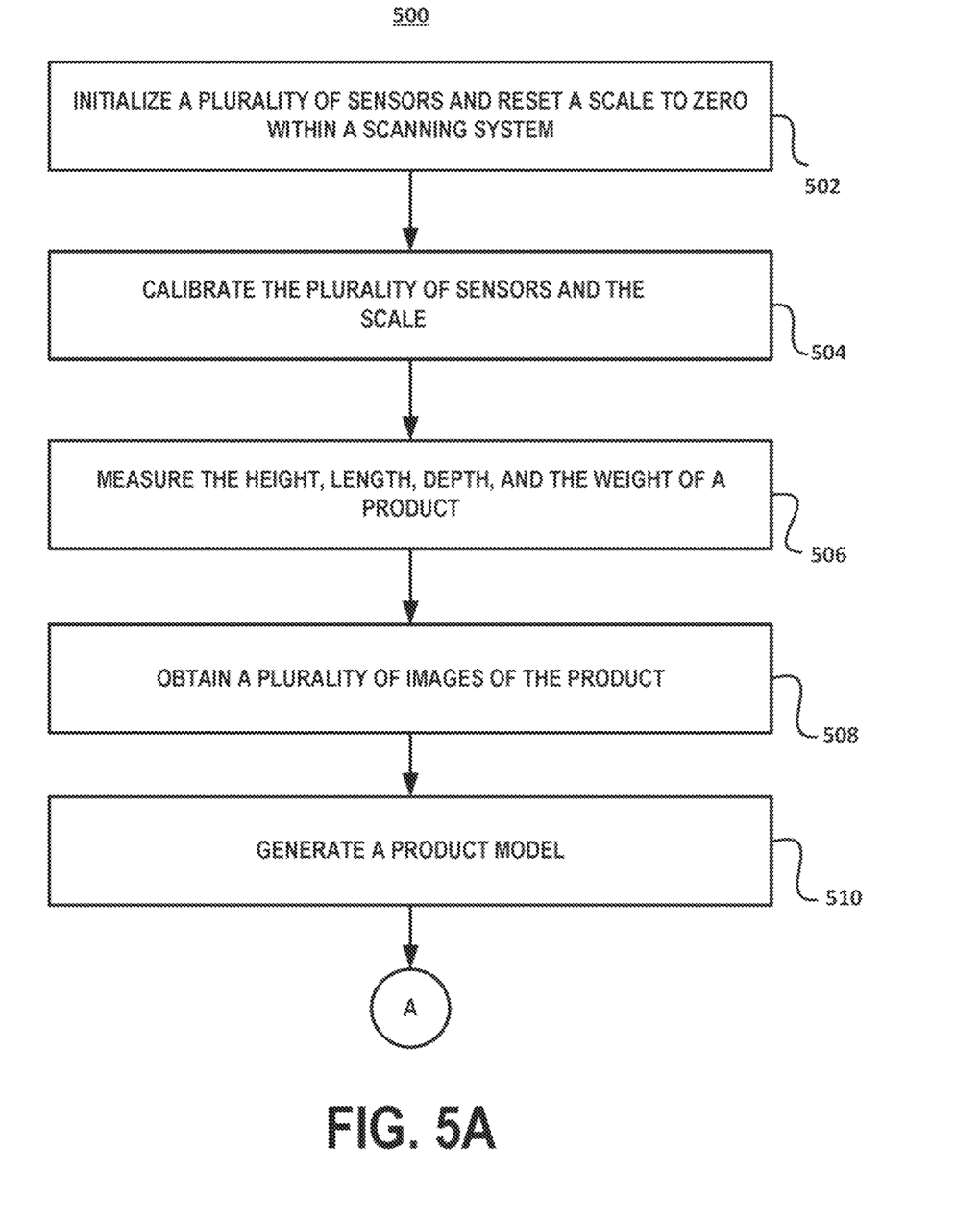
FIGS. 5A-5B illustrates an exemplary process in accordance with an embodiment of the invention.
Figure 5B:
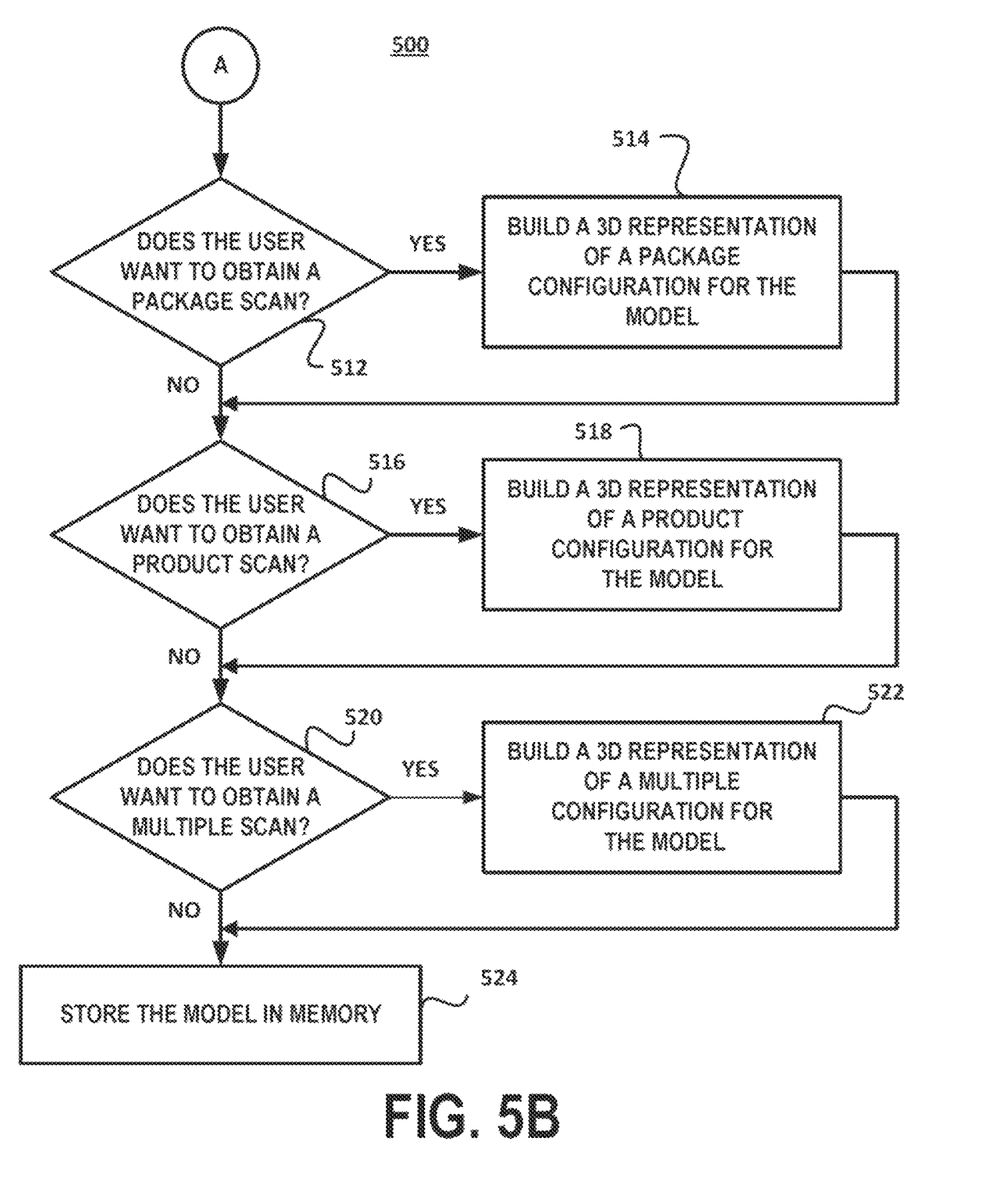

Referring to FIG. 5A-5B, with continuing reference to the foregoing figures, a method 500 is illustrated as an embodiment of an exemplary method for creating electronic/digital models of products to assist in the management of a supply chain in accordance with aspects of the described subject matter. Portions of method 500 can be performed by one or more computing devices, a computer system, computer-executable instructions, software, hardware, firmware or a combination thereof in various embodiments. For example, portions of method 500 can be performed by computing device 130 or other suitable computer system.

At 502, a plurality of sensors is initialized and a scale is reset to zero within a scanning system. In this exemplary embodiment, the scanning system can be scanning system 100 shown in FIG. 1. The sensors that can be initialized can be top sensor 114, bottom sensor 116, moving sensor 118, and camera 120. The scale can be weight sensor 122.

At 504, the plurality of sensors and the scale are calibrated. In this exemplary embodiment, the calibration device 128 can be used to calibrate the top sensor 114, the bottom sensor 116, the moving sensor 118, the camera 120, and/or the weight sensor 122.

At 506, the height, length, depth, and the weight of a product are measured. In this exemplary embodiment, the scanner 110 can implement and utilize the top sensor 114, the bottom sensor 116 and/or the moving sensor 118 to measure the height, the weight, and the depth of the product. The scanner 110 can implement and utilize the weight sensor 122 to measure the weight of the product.

At 508, a plurality of images of the product are obtained. In this exemplary embodiment, the scanner 110 can implement and utilize the camera 120 to obtain a plurality of images of the product.

At 510, a product model is generated. In this exemplary embodiment, computing device 130 generates the product model using computer-implemented method 400 shown in FIG. 4, except that the computing device 130 does not build a three dimensional representation of the product. Rather, the computing device 130 determines which configurations of the product should be included in steps 512-522.

At 512, a computer system determines whether a user wants to obtain a package scan. If the user wants to obtain a package scan, the computer system will build a three dimensional representation of a package configuration for the model at 514. In this exemplary embodiment, the computing device 130 can build a package configuration that includes additional data that can facilitate inventory management, such as weight, manipulation target regions, and landmark (e.g., UPC code) locations. Additionally, the package configuration can include images that can be used for autonomous identification.

At 516, a computer system determines whether a user wants to obtain a single product scan. If a user wants to obtain a single product scan, the computer system will build a three dimensional representation of a product configuration for the model at 518. In this exemplary embodiment, the computing device 130 can extract high quality images of each side of the product that are suitable for display in an e-commerce application, marketing brochures, and other applications, for the product configuration.

At 520, a computer system determines whether a user wants to obtain a multiple scan. If a user wants to obtain a multiple scan, the computer system will build a three dimensional representation of a multiple configuration for the model at 522. In this exemplary embodiment, the computing device 130 can build a three-dimensional representation of a bundle of packaged products that is similar to the packaged scan at steps 512-514. However, the multiple configuration will include an indication that this is an item that could have a single UPC code, which can be important for future inventory management.

At 524, the model is stored in memory. In this exemplary embodiment, the computing device 130 can store the model in memory 134. Alternatively, the model can be stored in a database, such as the database 320 shown in FIG. 3. Then, the model can be accessed by the inventory management system 344, the inventory robots 346 and/or users of the website 350.

Supported Aspects

The detailed description provided above in connection with the appended drawings explicitly describes and supports various aspects of generating a product model in accordance with the described subject matter. By way of illustration and not limitation, supported aspects include a system for generating a product model comprising: a scanner having a first sensor for measuring the dimensions of a product, a second sensor for measuring the weight of the product, and a third sensor for obtaining a plurality of images of the product, a computing device including at least one processor configured to execute computer-executable instructions and memory storing computer-executable instructions configured to: determine the shape of the outer surface of the product, estimate the center of gravity of the product, build the model of the product that includes a three dimensional representation of the shape of a configuration of the product and the estimated center of gravity of the product, and store the model in memory.

Supported aspects of generating product models include the foregoing system, wherein the memory further stores computer-executable instructions configured to: identify at least one landmark on the outer surface of the product and associate the landmark with the model.

Supported aspects of generating product models include any of the foregoing systems, wherein the landmark is a barcode selected from a group consisting of a UPC code, an EAN code, and a GTIN code.

Supported aspects of generating product models include any of the foregoing systems, wherein the model includes multiple configurations selected from the group consisting of a single product configuration, a packaged product configuration, and a bundled product configuration.

Supported aspects of generating product models include any of the foregoing systems, wherein memory further stores computer-executable instructions configured to: upload the model to a server.

Supported aspects of generating product models include any of the foregoing systems, wherein the server hosts a website and provides access to the model through the web site.

Supported aspects of generating product models include any of the foregoing systems, wherein the server includes an interface to provide access to the model.

Supported aspects of generating product models include any of the foregoing systems, wherein the memory further stores computer-executable instructions configured to: upload the model into a cloud environment provided by a cloud services provider.

Supported aspects of generating product models include any of the foregoing systems, wherein the third sensor is a camera.

Supported aspects of generating product models include a method, an apparatus, and/or means for implementing and/ or performing any of the foregoing systems or portions thereof.

Supported aspects include a method for managing a supply chain comprising: measuring the dimensions and the weight of a product, obtaining a plurality of images of the product, determining the shape of the outer surface of the product, calculating the estimated center of gravity of the product, generating a product model that includes a three dimensional representation of the shape of a configuration of the product and the estimated center of gravity of the product, and storing the product model in memory.

Supported aspects for managing the supply chain include the foregoing method, further comprising: identifying at least one landmark on the outer surface of the product, and adding the landmark to the product model.

Supported aspects for managing the supply chain include any of the foregoing methods, wherein the landmark is a barcode selected from a group consisting of a UPC code, an EAN code, and a GTIN code.

Supported aspects for managing the supply chain include any of the foregoing methods, wherein the product model includes multiple configurations selected from the group consisting of a single configuration of the product, a packaged configuration of the product, and a bundled configuration of the product.

Supported aspects for managing the supply chain include any of the foregoing methods, further comprising: uploading the product model to a server.

Supported aspects for managing the supply chain include any of the foregoing methods, further comprising: hosting a website, and providing access to the product model through the website.

Supported aspects for managing the supply chain include any of the foregoing methods, further comprising: providing access to the model through an interface.

Supported aspects for managing the supply chain include any of the foregoing methods, further comprising: uploading the product model into a cloud environment provided by a cloud services provider.

Supported aspects of generating product models include a system, an apparatus, and/or means for implementing and/or performing any of the foregoing methods or portions thereof.

Supported aspects include a supply chain management system comprising: a scanner for measuring the dimensions and the weight of a product and for obtaining a plurality of images of the product, a computing device having software for generating a model of the product, the software having a first module for determining the shape of the outer surface of the product, a second module for calculating the estimated center of gravity of the product, and a third module for building a model of the product that includes a three dimensional representation of the shape of the configuration of the product and the estimated center of gravity of the product, and a database for storing the model.

Supported aspects include the foregoing system, wherein the computing device is connected to the database over a network.

Supported aspects include any of the foregoing systems, wherein the database is connected to at least one of inventory management component and a web site over the network.

Supported aspects of supply chain management include a method, an apparatus, and/or means for implementing and/ or performing any of the foregoing systems or portions thereof.

Supported aspects of generating product models can provide various attendant and/or technical advantages in terms of improved efficiency and/or savings. By way of illustration and not limitation, various features and implementations of the systems and methods in accordance with the described subject matter offer many benefits, which include the generation of high-resolution 3D models that provide valuable information such as height, width, depth, center of gravity estimates and finer details like curvature and texture of the object or objects. The 3D scanning and features extraction can be optimized for speed to improve product throughput. Photos are taken of each side of the product for the purpose of identification or verification of the product. Photos of the product from each side (top, bottom, front, back, left and right side) are valuable visual clues for the purpose of identification.

In the case of machine learning tools, these images are useful for training the automation tools. Once trained the models help identify products from each other, but also provide useful orientation information of the product. For example, if the automation system detects the top of a particular box, the automation system will understand that it is the top and will be able to determine if it could pick the item from the top or if it must turn it or change grasping hardware or technique.

Supported aspects can include systems and methods that locate products in a collection of other products, such as from the photos. Such systems can use machine learning to identify the product when parts of the box are obscured. This could be the case in things like random bin picking or identifying product when mixed in with a random collection of other products.

Supported aspects can include systems and methods that measure the weight of a product to allow systems that include manipulation tools to determine how to prepare for manipulation of this object. Automation tools can use the weight and estimated center of gravity of products to determine how to manipulate products before beginning to manipulate those objects. For heavy objects, a robotic manipulation system can need to switch an end-effector or to a grasping device. Alternatively, the system may need to move slower to prevent the product from escaping the grasp of the manipulator.

Supported aspects can enhance the operation of inventory management systems and autonomous robots that utilize suction cups. In such systems, the force of the suction is known in advance, so that the momentum of a heavy item can exceed the suction force provided by the suction cup when moving at high speeds. In such cases, the product can be dropped during grasping operations.

Supported aspects can utilize systems and methods that provide accurate location of the UPC codes, other bar codes, or other landmarks. These codes and/or landmarks can be extracted for understanding orientation of the product after it is identified by a robotic manipulation system at a future date or for the autonomous system to know how to position the product so it can be scanned as it is going into the tote.

Supported aspects can enhance piece picking operations by scanning bar codes for final verification of the product and by determining the orientation of the product via machine learning techniques. These operations can be mandated for some piece picking tasks.

Supported aspects can use 3D models, product orientation, and photos of the product with the inventory management system to orient the product over a scanner system, such that the barcode is read as the product is being placed into a bin or shipping container. For some tasks, such as automated put away, placing products on a shelf with the bar code facing out can speed up future attempts to manipulate this item. Moreover, knowing the exact location will allow an autonomous put away system to position the product with UPC code facing out from the shelf, which is a desirable orientation.

It should be understood that the term "website", as used herein, includes any type of related e-commerce platform or application.

Although the invention has been described in considerable detail with reference to certain preferred embodiments thereof, other versions are possible. Therefore, the spirit and scope of the invention will not be limited to the description and the preferred versions contained within this specification.

What is claimed is:

1. A supply chain management system comprising:
a scanner comprising:
a plurality of sensors configured to collect data about a product, wherein the data includes a weight of the product, dimensions of the product, and one or more images of the product,
a computing device including at least one processor configured to execute computer-executable instructions, and a memory storing the computer-executable instructions and the data collected by the plurality of sensors, and
a communication interface configured to transfer the data collected by the plurality of sensors;
an inventory management system; and
one or more inventory robots configured to travel within a supply chain facility and communicate with the inventory management system to obtain a product model for the product and to use the product model to retrieve the product from or deliver the product to a location within the supply chain facility,
wherein the product model is generated based on the data collected by the plurality of sensors of the scanner and includes at least an estimated center of gravity location of the product, the weight of the product, and the dimensions of the product, wherein the estimated center of gravity location of the product is generated based on at least the weight of the product and the dimensions of the product.

2. A method for supply chain management comprising:
obtaining data about a product using a scanner, wherein the data includes a weight of the product, dimensions of the product, and one or more images of the product;
generating a product model for the product based on the data from the scanner using computer-executable instructions of a computing device of the scanner;
sending the product model to an inventory management system comprising one or more inventory robots configured to travel within a supply chain facility; and
picking or putting-away the product within the supply chain facility using an end effector of one of the one or more inventory robots, wherein the inventory robot is configured to use the product model to pick the product,
wherein the product model includes at least an estimated center of gravity location of the product, the weight of the product, and the dimensions of the product, wherein the estimated center of gravity location of the product is generated based on at least the weight of the product and the dimensions of the product.

3. The system of claim 1, wherein the plurality of sensors comprise a first sensor for measuring the dimensions of the product, a second sensor for measuring the weight of the product, and a third sensor for obtaining the one or more images of the product.

4. The system of claim 1, wherein the product model includes multiple configurations selected from the group consisting of a single product configuration, a packaged product configuration, and a bundled product configuration.

5. The system of claim 1, wherein the computer-executable instructions of the computing device of the scanner generate the product model based on the data collected by the plurality of sensors.

6. The system of claim 1, wherein the scanner comprises a lighting configured to provide optimal lighting conditions for the plurality of sensors.

7. The system of claim 1, wherein the communication interface of the scanner is configured to transfer the data collected by the plurality of sensors, the product model, or both to the inventory management system.

8. The system of claim 1, wherein the communication interface of the scanner is configured to transfer the data collected by the plurality of sensors, the product model, or both to a remote database housed on a remote computer system.

9. The system of claim 3, wherein the remote database is a cloud-based database accessible by third party data users.

10. The system of claim 1, wherein the computing device is configured to identify at least one landmark on the product based on the data collected by the plurality of sensors, wherein the at least one landmark provides orientation information about the product.

11. The system of claim 10, wherein the at least one landmark comprises a barcode.

12. The system of claim 10, wherein the one or more inventory robots use the product model to position the product on a shelf in a specific orientation.

13. The method of claim 2, further comprising:
sending the product model to a cloud-based database accessible by third party data users.

14. The method of claim 2, further comprising:
sending the data from the sensors to a remote database housed on a remote computer system, wherein the remote database is a cloud-based database accessible by third party data users.

15. The method of claim 2, further comprising: after picking the product, determining a correct pick by the inventory robot based on the weight of the product.

16. The method of claim 2, further comprising: before picking or put-away of the product, identify at least one landmark on the product based on the data collected by the plurality of sensors, wherein the at least one landmark provides orientation information about the product.

17. The method of claim 16, wherein the at least one landmark comprises a barcode.

18. The method of claim 2, wherein the product model includes a three-dimensional representation of a shape of a configuration of the product.

19. The method of claim 18, wherein the configuration of the product includes a single product configuration, a packaged product configuration, or a bundled product configuration.

\* \* \* \* \*